United States Patent [19]
Osborn et al.

[11] Patent Number: 5,718,312
[45] Date of Patent: *Feb. 17, 1998

[54] VEHICLE PARK/LOCK MECHANISM WITH CONTROL MODULE HAVING A LOCKING MECHANISM AND A CONTROL SWITCH ACTUATED BY THE LOCKING MECHANISM

[75] Inventors: Charles Osborn, Spring Lake; Robert M. Medema, Muskegon; Andrew Ruiter, Spring Lake, all of Mich.

[73] Assignee: Grand Haven Stamped Products, Div. of JSJ Corporation, Grand Haven, Mich.

[*] Notice: The term of this patent shall not extend beyond the expiration date of Pat. No. 5,494,141.

[21] Appl. No.: 582,374

[22] Filed: Jan. 11, 1996

Related U.S. Application Data

[63] Continuation-in-part of Ser. No. 331,358, Oct. 27, 1994, Pat. No. 5,494,141, which is a continuation-in-part of Ser. No. 63,241, May 18, 1993, Pat. No. 5,402,870.

[51] Int. Cl.⁶ .................................................. B60K 41/26
[52] U.S. Cl. ................. 192/4 A; 74/475; 74/483 R; 70/248; 200/61.88
[58] Field of Search ............... 192/4 A; 477/96, 477/99; 70/248, 252, 254; 200/61.88; 180/271, 336; 74/475, 483 R

[56] References Cited

U.S. PATENT DOCUMENTS

| | | | |
|---|---|---|---|
| 2,890,581 | 11/1959 | Lewis | 70/248 |
| 2,915,681 | 11/1959 | Troy | 317/123 |
| 3,939,940 | 2/1976 | Sasabe et al. | 180/82 C |
| 4,246,989 | 1/1981 | Kohler | 192/4 A |
| 4,880,092 | 11/1989 | Kito et al. | 192/4 A |
| 4,905,802 | 3/1990 | Gotoh | 192/4 A |
| 4,930,609 | 6/1990 | Bois et al. | 192/4 A |
| 4,932,493 | 6/1990 | Sakurai et al. | 180/271 |
| 4,966,262 | 10/1990 | Mieczkowski | 192/4 A |
| 5,018,610 | 5/1991 | Rolinski et al. | 192/4 A |
| 5,036,962 | 8/1991 | Amagasa | 192/4 A |
| 5,063,817 | 11/1991 | Bogert | 74/878 |
| 5,096,033 | 3/1992 | Osborn | 192/4 A |
| 5,129,494 | 7/1992 | Rolinski et al. | 192/4 A |
| 5,167,308 | 12/1992 | Osborn | 192/4 A |
| 5,181,592 | 1/1993 | Pattock | 192/4 A |
| 5,211,271 | 5/1993 | Osborn et al. | 192/4 A |
| 5,272,458 | 12/1993 | Hoffman et al. | 335/179 |
| 5,402,870 | 4/1995 | Osborn | 192/4 A |
| 5,489,246 | 2/1996 | Moody et al. | 477/96 |
| 5,494,141 | 2/1996 | Osborn et al. | 192/4 A |

FOREIGN PATENT DOCUMENTS

| | | |
|---|---|---|
| 1203756 | 4/1986 | Canada. |
| 0246353 | 11/1987 | European Pat. Off.. |
| 0300268 | 1/1989 | European Pat. Off.. |
| 0347150 | 12/1989 | European Pat. Off.. |
| 0372357 | 6/1990 | European Pat. Off.. |
| 0390590 | 10/1990 | European Pat. Off.. |
| 0400727 | 12/1990 | European Pat. Off.. |
| 0519208 | 12/1992 | European Pat. Off.. |
| 3943011 | 6/1990 | Germany. |
| 59-176253 | 11/1984 | Japan. |
| 60-23427 | 2/1985 | Japan. |
| 4-60270A | 2/1992 | Japan. |

*Primary Examiner*—Richard M. Lorence
*Attorney, Agent, or Firm*—Price, Heneveld, Cooper, DeWitt & Litton

[57] ABSTRACT

A vehicle park/lock mechanism with a novel control module in which is located a locking mechanism, an electrically actuated actuator for actuating said locking mechanism said module including a control switch which is actuated in response to the actuation of the locking mechanism. A restraining member is provided to prevent actuation of such switch to assure complete unlocking of the locking mechanism before the switch is actuated.

54 Claims, 5 Drawing Sheets

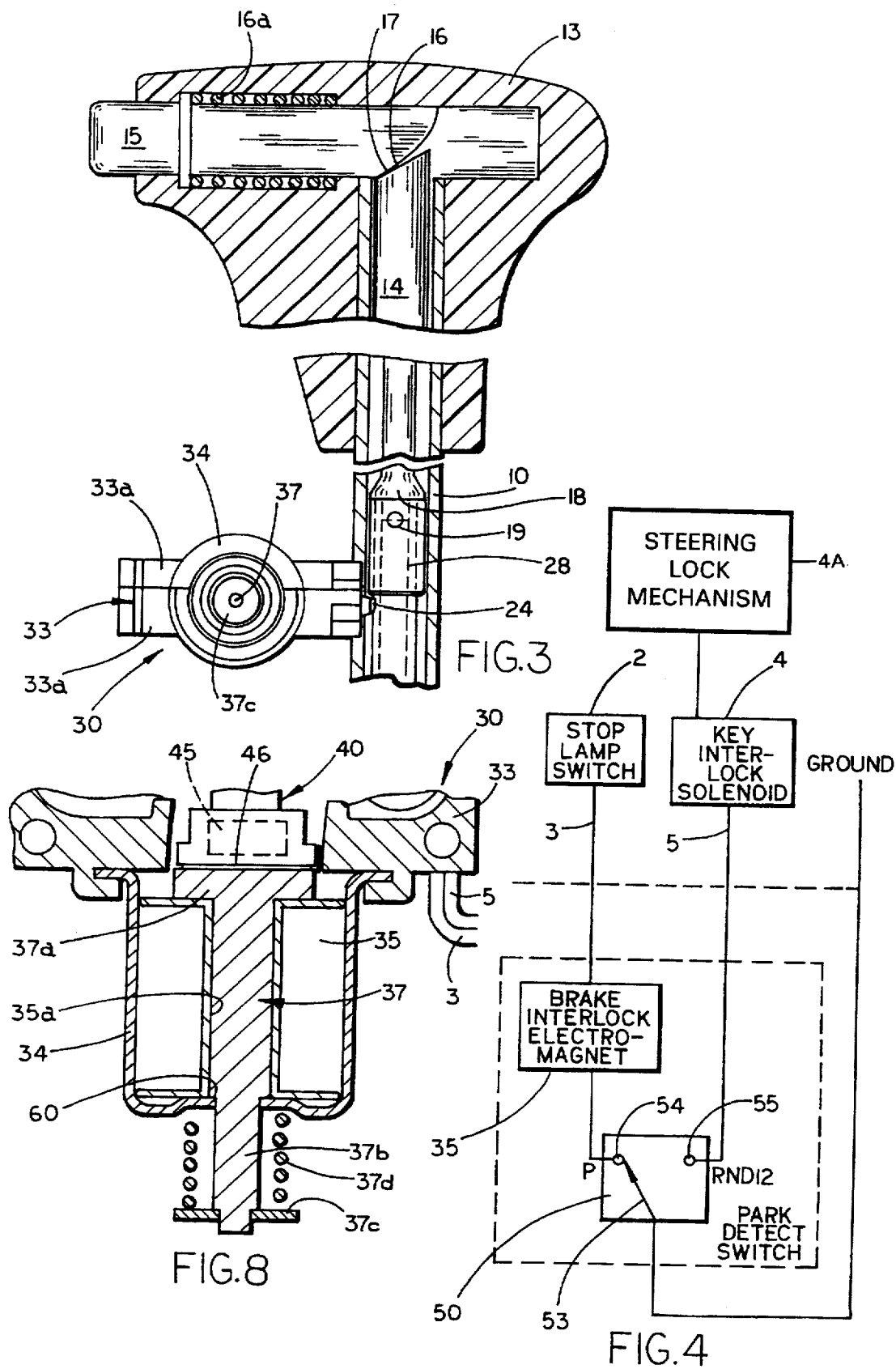

VEHICLE PARK/LOCK MECHANISM WITH CONTROL MODULE HAVING A LOCKING MECHANISM AND A CONTROL SWITCH ACTUATED BY THE LOCKING MECHANISM

This application is a continuation-in-part of application Ser. No. 08/331,358 filed Oct. 27, 1994, now U.S. Pat. No. 5,494,141, which is a continuation-in-part of application Ser. No. 08/063,241 filed May 18, 1993, now U.S. Pat. No. 5,402,870.

This invention relates generally to a vehicle park/lock mechanism with a control module for controlling the locking mechanism for a shifting lever of an automatic transmission. More particularly, such control module includes a locking mechanism for locking the shift lever in a park position against rotation to other gear positions and also includes a control switch actuated by the locking mechanism. More specifically, this invention relates to an improvement in the locking mechanism of U.S. Pat. No. 5,402,870 entitled "VEHICLE PARK/LOCK MECHANISM" filed on May 18, 1993, and issued on Apr. 4, 1995, and also the locking mechanism of co-pending patent application Ser. No. 08/331,358 filed on Oct. 27, 1994 and entitled "VEHICLE PARK/LOCK MECHANISM"(now U.S. Pat. No. 5,494, 141); of which this patent application is a continuation in part.

In co-pending application Ser. No. 08/331,358 (now U.S. Pat. No. 5,494,141) and in U.S. Pat. No. 5,402,870, the problems that have been encountered in the unattended acceleration of a vehicle and shifting from the park position to the other gear positions are explained. Such problems prompted efforts which have been made to prevent the shifting of the shift lever until the brake pedal has been depressed so that the vehicle does not move before it is intended by the driver. In U.S. Pat. Nos. 5,096,033 and 5,402,870 and also in U.S. patent application Ser. No. 08/331,358 (now U.S. Pat. No. 5,494,141) there is disclosed electrically operated control modules. These control modules are controlled by the application or non-application of the brakes of the vehicle in which the shifter is mounted. When the brakes are not applied, the pins are in an extended position which prevents the actuation of a pawl actuator and, accordingly, the pin, when extended, prevents the shifting of the shift lever. However, when the pin is distended by applying the brakes, it is located out of the path of the lockout arm, permitting the actuation of the pawl and shifting of the shift lever from park position to other gear positions. In U.S. Pat. No. 5,402,870 and co-pending application Ser. No. 08/331,358 (now U.S. Pat. No. 5,494,141), it was pointed out that there are other types of lockout mechanism that have been devised. One such suggested mechanism was to mount an electrically operated control module having a pin movable between a distended position to an extended position on the tube of a shift lever. In such mechanisms, the pin is movable in response to the energization of the coil of the module to an extended position and into the path of the pawl actuator. The pin actually is an armature forced by the magnetic field of the coil into a notch formed in the side of the pawl actuator locking the pawl actuator against movement by the driver. Both the pin and notch included angled sides which engage each other so that when the coil is not energized, the pin was a cammed out of the way of the pawl actuator permitting the driver to move the pawl out of the park/lock position. In this proposed design, the axial center of the coil of the module and the pin extended along an axis parallel to the pawl actuator and the pin was held in the notch of the pawl actuator by a magnetic force and was withdrawn from the notch by a spring. This arrangement resulted in a temporary binding force between the pawl actuator and the pin which gave an undesirable feel to the driver. As a result it was contemplated to provide two similar modules spaced one above the other in an attempt to eliminate such binding. Such previous design also had the decided disadvantage of cost in requiring constant energization of coils during the park/lock condition of the shifter.

U.S. Pat. No. 5,402,870 discloses a simplified, lower cost version of a brake/park lock mechanism for preventing a driver from shifting a shift lever from park position to another gear position unless the brake is applied. Such device includes the combination of a locking member and mechanical advantage means for actuating the locking member by applying a force on the mechanical advantage means in a direction substantially orthogonal to the direction of the movement of a locking member. Such combination takes advantage of the lesser force required to move the locking member into locked position and a greater force exerted by the mechanical advantage means in holding the locking member in locked position.

More specifically, the device of application Ser. No. 08/063,241 (now U.S. Pat. No. 5,402,870) discloses a unique mechanical advantage means which comprises a toggle joint operatively connected between the actuator of the electrical module and the locking member, thus utilizing the mechanical advantage of the toggle joint. Therefore, in the locked position of the locking member, the toggle joint is capable of withstanding the inadvertent force a driver might exert on the pawl actuator without applying the vehicle's brakes. The toggle mechanism includes at least two links which are pivotally connected together at one of their ends at a point referred to hereinafter as the "knee." At their other ends, one of the links is pivoted about a fixed axis and the other end of the link is slidable and connected to the locking member. When the two links are aligned or nearly aligned with the pivotal axis of the knee on the center line between the pivotal axes of the other ends of the links, the force required on the locking member substantially along such center line to pivot the two links is tremendous. However, if the pivotal axis or knee of the two links is moved a sufficient distance off center in one direction, the two links can be pivoted relative to each other with very little force on the locking member. Thus, as the distance between the center line and the axis of the knee between the two links increases, the amount of force required to move the pawl actuator decreases.

The device of U.S. Pat. No. 5,402,870 takes advantage of the above phenomenon by applying a force to the knee between the links toward the center line by a biasing means such as a spring, until the knee reaches the center line or slightly beyond where it abuts against a stop. At such position, the locking member is immovable until the module actuator, which is movable in response to the coil of the module and is connected to the toggle joint at the pivotal axis or knee between the two links, pulls the knee away from the center line, thus greatly reducing the restraining force of the toggle.

A control module of U.S. application Ser. No. 08/331, 358 (now U.S. Pat. No. 5,494,141) takes advantage of the above phenomenon by applying a force to the knee between the links in a direction toward the center line by a permanent magnetic force until the axis of the knee reaches a position only slightly above the center line. At such position, the locking member is immovable until a repelling magnetic force is exerted on the knee to force the knee away from the center line, thus greatly reducing the restraining force of the toggle and, in fact, moving the locking member to an unlocked position.

The magnetic attracting and repelling forces exerted on the knee between the links toward and away from the center line are created by a permanent magnet associated with the module actuator. The polarized permanent magnet is attracted to a metal core surrounded by a coil that is energized in response to the application of the brakes of the vehicle. Thus, in the locked position of the knee of the toggle joint, the permanent magnet is attracted to the metal core to move and hold the locking member in locked position. However, when the coil is energized, it changes the magnetic pole at the end of the metal core, causing the polarized permanent magnet to be repelled and thus, the central axis of the knee to be forced away from the center line so as to reduce the restraining force of the toggle and, in effect, withdraw the locking member out of the locked position.

In accordance with the present invention which is an improved version of the mechanism of U.S. application Ser. No. 08/331,358 (now U.S. Pat. No. 5,494,141) we have modified the control module by incorporating therein not only a lock mechanism but a control switch actuated by the locking mechanism in response to the movement of the locking member or pin to a completely unlocked position of the locking member. In the preferred form of this invention, when the coil is energized, the magnetic pull at the end of the metal core is changed causing the polarized permanent magnetic to be repelled, the central axis of the knee is forced away from the center line of the locking member as in the module of our co-pending application. In addition to the locking mechanism, we provide above the knee of the toggle joint a switch positioned to be actuated by the movement of the knee of the toggle joint so as a result when the locking member is completely in the unlocked position, the knee actuates the switch which in turn controls an electrical interlocked module for controlling a steering lock and ignition switch key lock mechanism. Therefore, one of the objects of this invention is to provide a control module which includes both a locking mechanism and a control switch actuated by the locking mechanism so that the actuation of the push button for the shifting lever which ultimately unlocks the lever for shifting to positions other than "Park" is coordinated with the actuation of the key interlock solenoid. This is important because it is absolutely essential that the steering lock mechanism is not locked when the shifter is in any one of the non-park positions.

In order to prevent the steering mechanism from being locked while the shifter lever is in an out of park position, the knee of the toggle joint is constantly actuating the control switch while the lever is in the out of park position. Thus, the control switch in the control module controls the key interlock solenoid which in turn controls a steering locking mechanism. In accordance with this invention a coil is provided for actuating an actuator member that breaks the knee and moves it to a first position where it is restrained by a resilient member from further movement just shy of the actuation of the switch. However, in this first position of the knee or actuator member, the force required to move the locking member from said first position to a completely unlocked position is sufficiently low that the operator of the vehicle by pushing on the button of the handle actuator overcomes the restraining force of the resilient member to move the locking member to the completely unlocked position in which the knee or actuating member is in a second position for actuating the control switch. Thus, the present invention causes the key interlock solenoid to release the steering locking mechanism only when a shift lever is released for shifting to out of park positions. Further, in accordance with well known steering lock mechanisms they are rendered ineffective during the time that the shifting lever is in the out of park positions.

Having briefly described the physical features of the invention, the following drawings with a more detailed description will serve to explain the concepts and principles of the invention.

BRIEF DESCRIPTION OF THE DRAWINGS

FIG. 3 is an enlarged, cross-sectional, side-elevational view of the invention, in disclosing a control module mounted on a shifting lever;

FIG. 4 is a block circuit diagram of the module;

FIG. 8 is a partial, cross sectional side elevational view of the module.

DESCRIPTION OF THE PREFERRED EMBODIMENT

Figure 1:
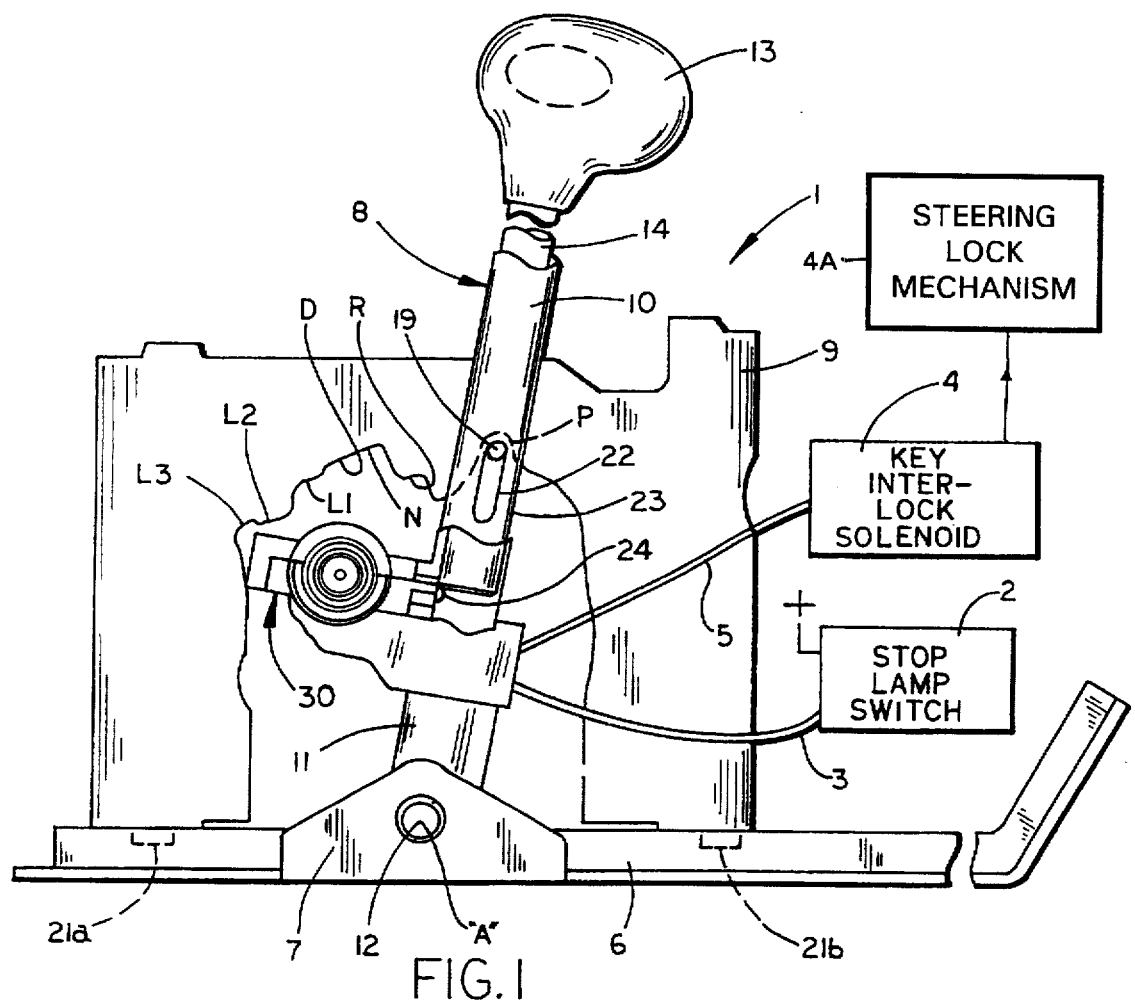
FIG. 1 is a sketchy, side elevational view of the shifter of this invention without the cable brackets.

Referring to the drawings, and particularly to FIG. 1, reference numeral 1 designates an automatic shifting mechanism for an automotive vehicle electrically connected to the Stop Lamp Switch 2 by an electric cord 3 and to a Key Interlock Solenoid 4 by electric cord 5. When energized, Key Lock Solenoid 4 releases the Steering Lock Mechanism 4A. It should be understood that this automatic shifting mechanism can be utilized in any system as disclosed in U.S. Pat. No. 5,096,033 and U.S. application Ser. No. 08/331,358, (now U.S. Pat. No. 5,494,141) both of which are incorporated herein by reference, although it can be used in many difference systems wherein a park/lock has to be made responsive to a predetermined condition of the motor vehicle.

Shifting mechanism 1 includes a base 6 having a pair of spaced ears 7 supporting the shift lever 8 about the axis "A." The base also supports the upright detent plate 9. Shift lever 8, as disclosed in FIGS. 1 and 3 is of the conventional type which includes a tube 10 secured at its lower end to the housing 11 which, in turn, is pivoted about the axis "A" by an axle 12 extending between the two ears 7. Housing 11 is pivotally mounted for pivoting the shift lever 8 to different gear positions.

A handle 13 is secured to the top of the tube 10 and provides a housing with means for actuating the pawl actuator 18 which is biased upwardly in the tube 10 by a spring not shown. The means for actuating pawl actuator 18 includes a rod 14 contacting the button 15 slidably mounted within the handle 13. Incline camming surface 16 of button 15 contacts the inclined cam surface 17 of a rod 14 so that when the button 15 is depressed to overcome the bias of spring 16a, the rod or shaft 14 is forced downwardly. The pawl actuator 18 is located below the rod 14 and supports the pawl 19 that holds the shift lever 8 in various gear positions as established by the detent plate 9.

The pawl 19 extends through the pawl actuator 28 and extends through slots 22 on each side of the tube 10, the pawl is thus movable downwardly through the slots 22 and 23 from the position as disclosed in FIG. 1 to a position wherein the shift lever can be pivoted for locating the pawl 19 in any of the notches P, R, D, L1, L2 and L3.

Detent plate 9 is an upright plate having tabs 21a and 21b extending through openings in the base and secured in an upright position. Detent plate 9 has a central opening defining a series of notches designated by the letters "P," "R," "N," "D," "L1," "L2," and "L3." It is important that the park notch "P" is deeper than all of the remaining notches in order that the pawl is prevented from being locked in any other notch than in the park/lock notch P. One exception to this is if it is desirable for some reason or another to lock the pawl 19 in the neutral position "N" as well as in the park position "P", in which event the depth of the notch in both the park and neutral position should be the same.

The structure for locking the lever 8 in the park notch "P" comprises the control module 3 includes the toggle mechanism 32 connected to locking member or pin 24 and its associated magnetic actuating mechanism which in the park/lock position is disclosed in FIGS. 2, 5B, 6B, and 6C. Also reference is made to U.S. application Ser. No. 08/331,358, the disclosure of which is incorporated herein by reference.

Figure 2:
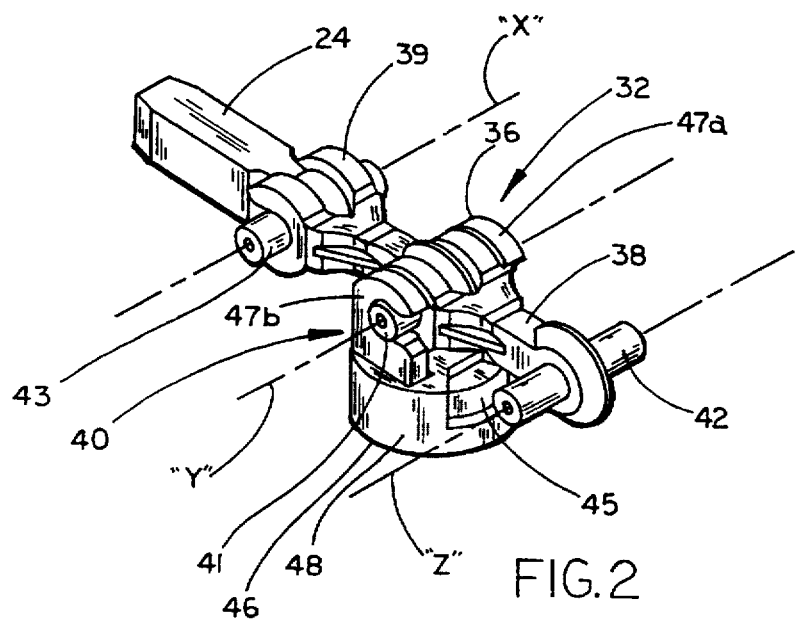
FIG. 2 is a side elevational perspective view of the toggle mechanism utilized in this invention to actuate the locking member.

FIG. 2 discloses the locking pin 24 and the toggle linkage 32 which comprises the three links 38, 39, and 40 all of which are pivotally connected together at one of their ends on the pin 41 about the axis "Y." The other end of link 38 is pivoted on the pin 42 about the fixed axis "Z." The other end of link 39 is pivotally mounted by the pivot pin 43 to the locking pin 24 for pivotal movement about the axis "X." The ends of pin 43 are slidable in the grooves 44 (FIG. 5B) provided in each part 33a and 33b of the housing 33 in which the locking mechanism is mounted.

Link 40 includes the spaced upper ends 47a and 47b pivotally mounted on the pin 41. Mounted below ends 47a and 47b is a housing 48 in which magnet 45 is mounted.

Figure 5A:
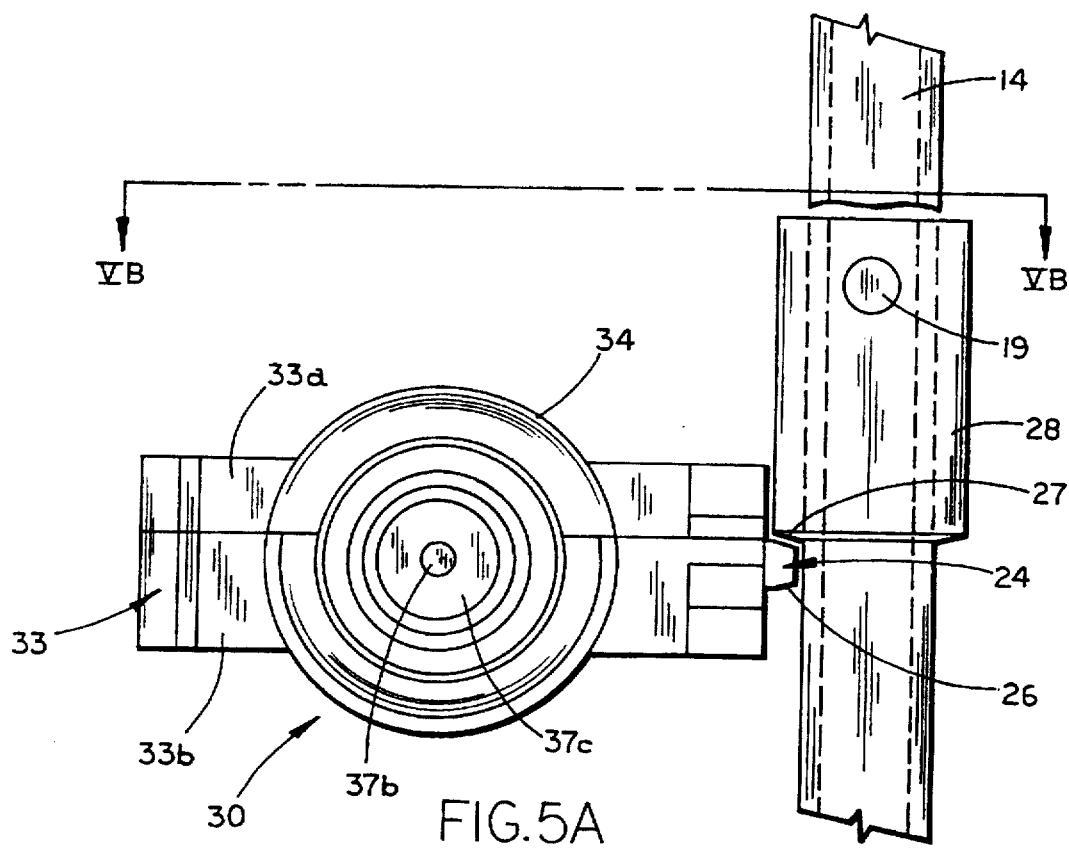
FIG. 5A is an enlarged side elevational view of the control module illustrating its relationship to the pawl actuator located within the tube of the shift lever, the pawl actuator being unactuated.
Figure 5B:
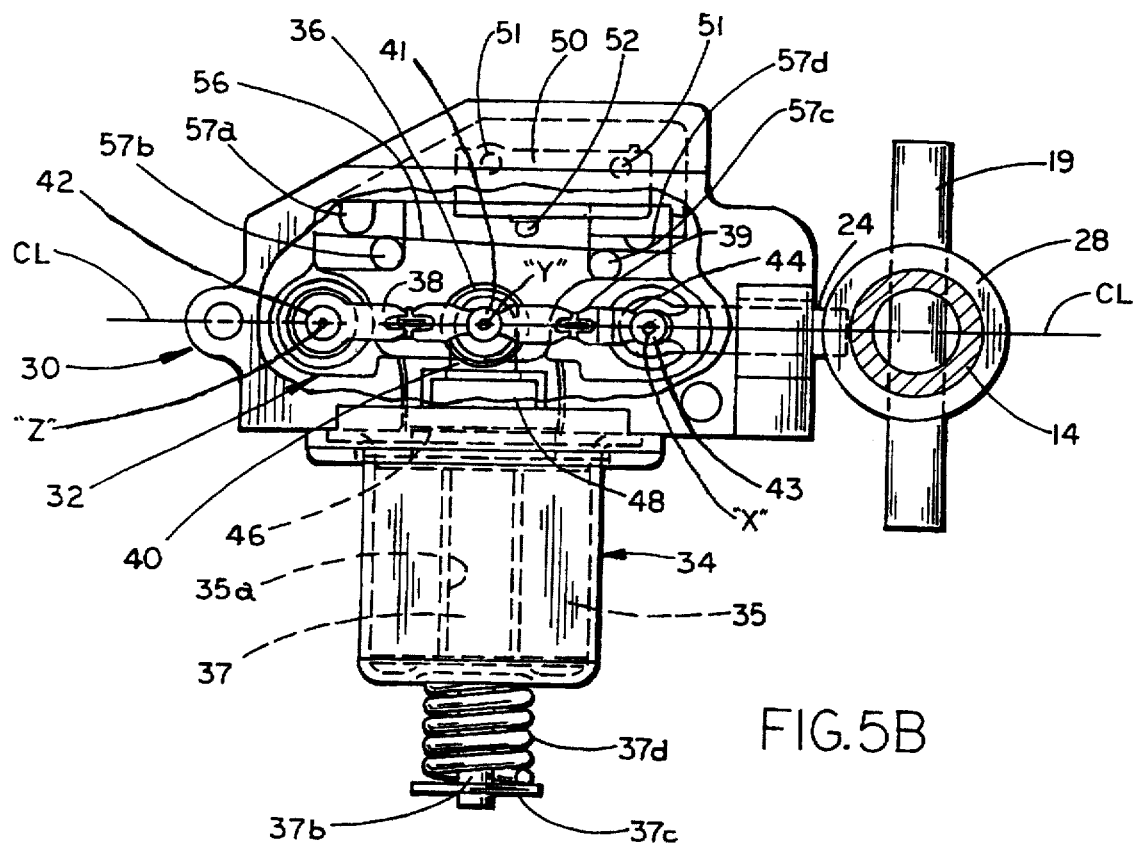
FIG. 5B is a view of the mechanism of FIG. 5A looking downwardly from the plane VB—VB of FIG. 5A.

As disclosed in FIG. 5B, in the locked position of pin 24, the two axis "X" and "Z" are substantially aligned on the center line "CL" with the axis "Y" located slightly above centerline "CL." The distance of axis "Y" spaced above the center line "CL" is governed by the bottom end 46 of housing 48 abutting the top end 37a of the core 37. This distance is selected to provide the proper restraining force exerted by the toggle on pin 24, it being understood that as the axis "Y" moves away from the center line "CL" the amount of force required to move the locking pin 24 out of the locking position substantially decreases. Therefore, the slight spacing of axis "Y" above the center line "CL" is selected so that the restraining force on pin 24 prevents the driver by depressing button 15 from displacing the pin 24 toward the unlocked position while the brakes are not applied. In making this determination, it should be taken into account that in accordance with the well known principles of mechanics, the force reduces measurably as the axis "Y" moves up. As a practical measure, the distance can be best determined by trial and error after estimates are determined by the well known formulas for toggle joints. We have found the spacing should fall within a distance wherein the angle between the center line "CL" and the lines drawn between "X" and "Y" and "Z" and "Y" are each between one and three degrees (1°–3°) all as disclosed in our pending application Ser. No. 08/331,358 (now U.S. Pat. No. 5,494,141).

Toggle linkage 32 is mounted in housing 33 which is a plastic molded housing constructed in either one or two parts, preferably two parts for ease of assembly. The toggle linkage 32 is mounted in a lower part of the housing 33. A control switch 50 is mounted in the upper part of the housing 33 by means of pins 51 extending through the housing of the switch in and into recesses (not shown) in the walls of the housing parts 33a and 33b. Switch 51 includes a switch button 52 that moves switch element 53 (FIG. 4) from a first contact 54 to a second contact 55 as will be explained hereinafter.

A resilient spring member 56 is mounted in the housing between the switch 50 and the toggle joint 32. Spring member 56 which preferably is a leaf spring provides a restraining means to prevent the knee of the toggle and the link 40 from actuating the switch button 52 until such time as the operator of the vehicle presses button 15 to actuate pawl actuator 18 and actuator 28 as will be explained hereinafter. Resilient spring 56 is a leaf spring mounted in the position as disclosed in FIGS. 5B, 6B, and 7B by means of the protrusions 57a, 57b, 57c, and 57d between which spring 56 is captured for holding it in place but still permitting it to be flexed to the position as disclosed in FIG. 7B.

Figure 6A:
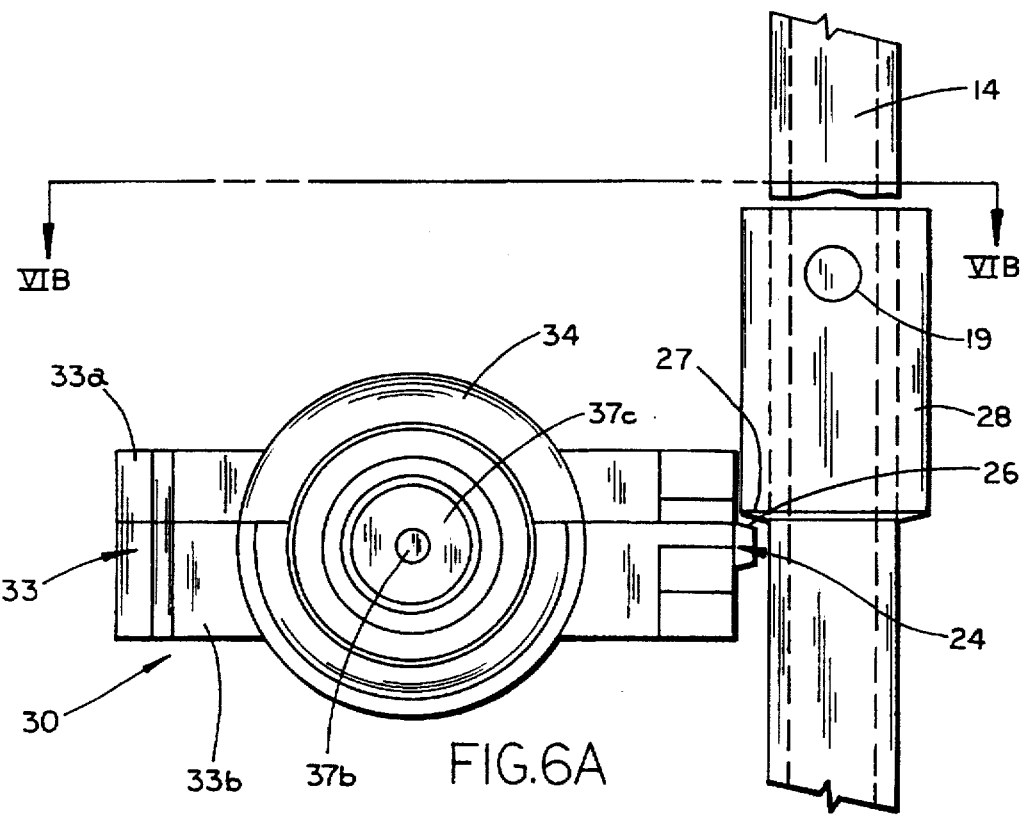
FIG. 6A is a side elevational view like that of FIG. 5A but disclosing the knee of the toggle joint being actuated to a first position nearly actuating the control switch.

Module 30 also includes a coil housing 34 secured to the bottom of housing 33 and containing the coil 35 and metal core 37 which is T-shaped as disclosed in FIG. 8. Core 37 is a magnetic metal part which is neutral and therefore, the magnet 45 in the link 40 (FIG. 2) is attracted to the core 37 thus urging the toggle joint 32 downwardly into the position as disclosed in FIG. 5B. However, when the coil 35 is energized, it magnetizes core 37 creating a south pole at its top end which repels magnet 45, thus forcing magnet 45 and the link 40, to which it is attached upwardly to the position as disclosed in FIG. 6B wherein the knee of the toggle linkage 32 engages the leaf spring 56. The repelling force of the core 37 on the magnet 45 is insufficient to overcome the bias of spring 56 and accordingly spring 56 restrains further movement of the knee 36 past the position as disclosed in FIG. 6B, which discloses the locking element 40 withdrawn to a first position as illustrated by FIG. 6A. In this first position, when inclined surface 27 of the actuator element 28 engages inclined surface 26 and a force is exerted on actuator 18 the actuator element 28 forces the locking member 24 inwardly into the housing 33 to the position of FIG. 7B at which position the switch push button 32 is depressed moving the switching element 53 from the contact 54 to the contact 55. This action is permitted by virtue of the knee having been broken to the position as disclosed in FIG. 6B at which position the combined restraining force exerted by the toggle joint 32 and spring 56 has diminished to a level that is less than the force transmitted to the locking member 24 by the actuator member 28.

It should be understood that magnet 45 could be a north pole in which event core 37 would be magnetized to produce a north pole at its top end. The important factor is that when the coil 35 is energized the poles of magnet 45 and the top of core 37 are like each other and therefore repel each other.

As disclosed in FIG. 8, core 37 is T-shaped thereby having a larger head 37a which rests on top of the coil 35. The extreme lower end 37b of the core 37 has a reduced diameter extending through an opening in the bottom of the housing 34 to provide a shoulder 60 which rests on the circumference of the opening to hold the core 37 in the opening 35a of coil 35. A washer like member 37c is mounted on the extreme lower end of core 37 and a spring 37d extends between the member 37c and the bottom surface of housing 34 so as to bias core 37 downwardly into the position as shown in FIG. 8. Core 37 is slidable within the opening of 35a and therefore provides a manual means whereby the locking member 24 can be manually forced to an unlocked position. This is accomplished by pushing upwardly on the lower end 37b of core 37 which manually breaks the knee 35 of the toggle joint 32 to a position as disclosed in FIG. 7B so as to manually actuate the locking member 24 to an unlocked position.

OPERATION

Having described the structure of our invention, an operation of the same should be evident. Referring to FIG. 5A, it shows the module 30 in locked position, that is, with the locking member or pin 24 extending into the path of the actuating member 28. In this position, the links 38, 39, and 40 are positioned with the axis "Y" located a slight distance above the center line "CL." This position is obtained by reason of the magnet 45 which has a south pole being attracted to the core 37. In this position, the pin or locking member 24 prohibits the pawl actuator 28 from being pushed downwardly by the vehicle operator since the actuator member 28 would strike the pin 24. As a result, the pawl 19 prevents the shifter from being shifted out of the park "P" slot. The position of the axis "Y" only a slight distance above the center line "CL" requires a tremendous force to be exerted longitudinally on the locking member in order to break the knee of the toggle joint. Thus, the driver is unable to actuate the pawl 19 by depressing plunger 15.

Figure 6B:
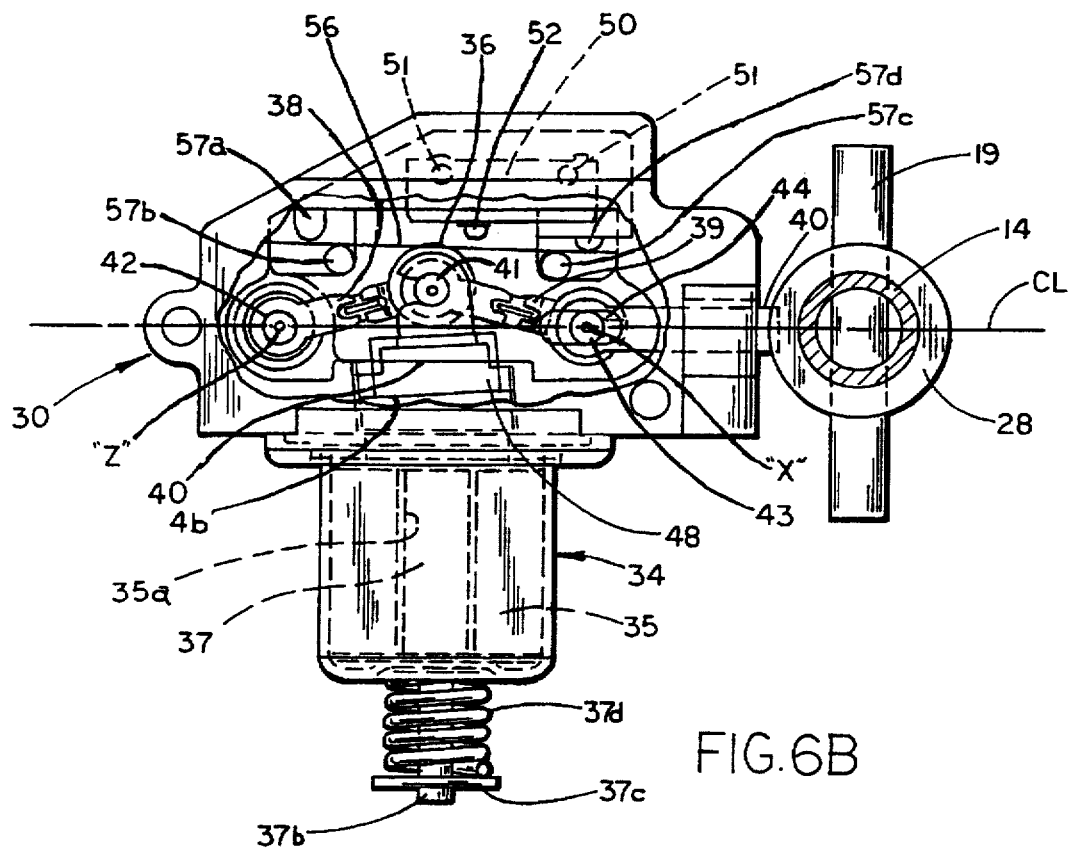
FIG. 6B is a top view of FIG. 6A looking downwardly from the plane VIB—VIB.

When the driver applies the brake, stop lamp switch 2 is actuated to energize coil 35 causing the top end of the core 37 to be a south pole, i.e. like that of the magnet 45. As a result, the south pole at the top end of core 37 repels the south pole of the magnet 45 embedded in the housing 48 of link 40. The link 40 is thus forced upwardly to the position, as disclosed in FIG. 6B against the spring 56 (FIG. 6B). The magnetic force on the magnet 45 transmitted to the link 40 forming a part of the knee 36 is insufficient to overcome the biasing force of the resilient leaf spring 56. When forced into the position of FIG. 6B, the toggle joint 32 pulls a locking member 24 to a position as disclosed in FIG. 6A. In this position, since the knee 36 is broke upwardly the restraining force on pin 24 is greatly reduced, permitting the operator of the vehicle to force the locking member 24 completely out of the locked position. As previously explained, this results by virtue of the restraining force of the toggle joint 32 being greatly reduced as the axis "Y" is moved upwardly by the repelling magnetic force of the core 37. When the operator of the vehicle presses on the button 15 a force exerted by surface 27 of the actuator member 28 on the surface 26 is sufficient to overcome the biasing force of the spring 56 permitting the knee 36 to move upwardly and actuate the switch button 52.

Now referring to FIG. 4, the actuation of push button 52 causes switch arm 53 to move from contact 54 to contact 55 which breaks the circuit to the coil 35 of the brake interlock electromagnet reducing the repelling force on the magnet 45; however, the actuator member 28 prevents the return of the locking member 24 to a locked position so long as the shifting lever is out of park since the elongated actuator member 28 is positioned in the path of the locking member 24 until the pawl 19 is returned to the park position as disclosed in FIGS. 1 and 5A. As a result, coil 35 cannot be energized until the pawl 19 is returned to the park position.

Figure 7A:
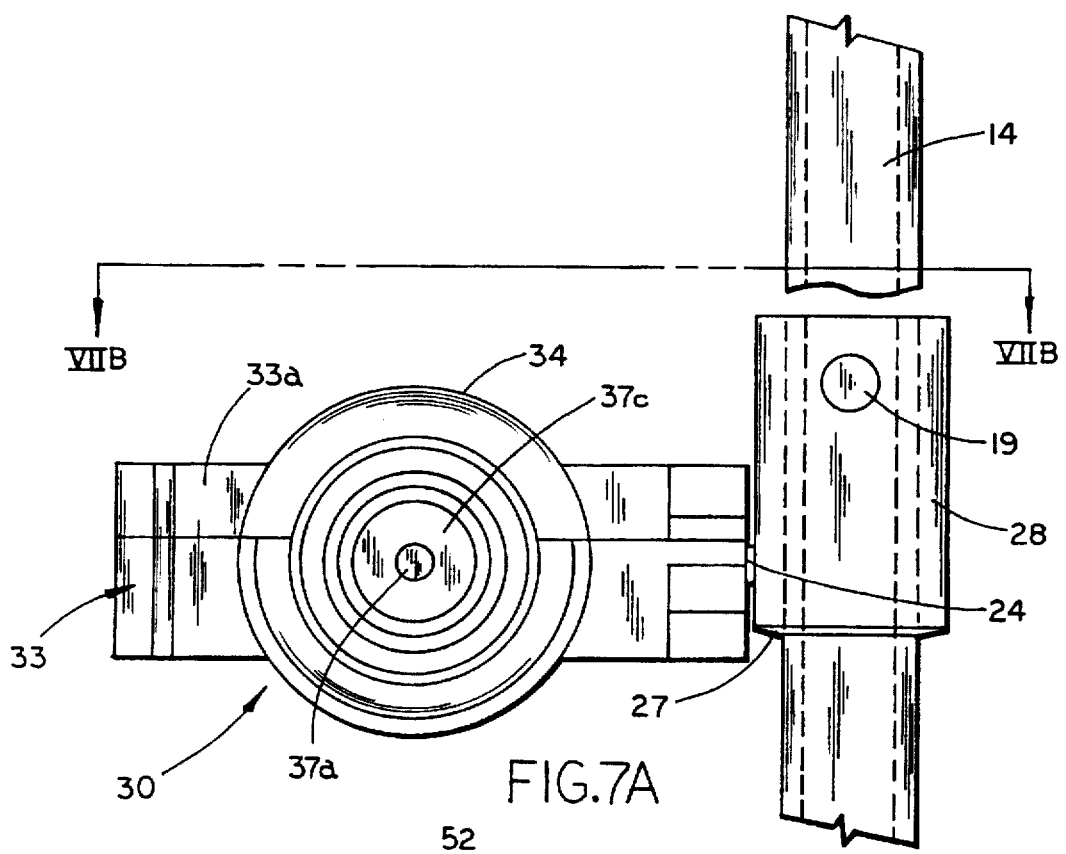
FIG. 7A is another side elevational view like that of FIGS. 5A and 5B in which the actuator has actuated the locking member to a completely unlocked position wherein the knee of the toggle joint is in a third position causing actuation of the control switch.
Figure 7B:
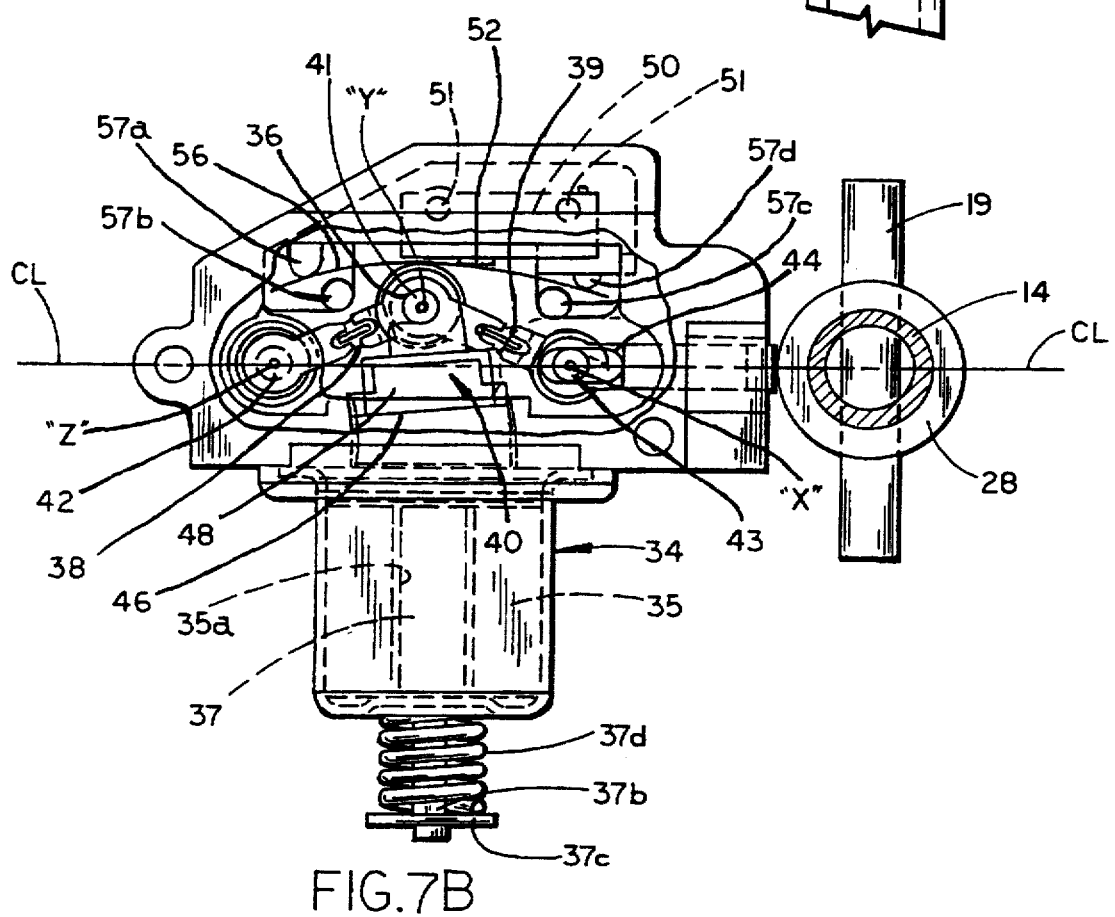
FIG. 7B is a top view of FIG. 7A looking downwardly from plane VIIB—VIIB.

When switch element 53 is moved to contact 55 a circuit is completed through line 5 to the key interlock solenoid 4. This key interlock solenoid 4 causes the steering lock mechanism 4A to be released when the key is turned on. Further, so long as this solenoid is energized, i.e., so long as locking member 24 is in the unlocked position of FIG. 7A, the steering lock mechanism is released, and in fact as is well known in many different steering lock mechanisms it is impossible to remove the key until the shifting lever is returned to the park position and the pawl 19 is moved upwardly into the park notch "P."

It should be obvious from the above description that the present invention has many advantages. For example, only one switch is utilized for controlling the actuation of the locking member and the energization of the key interlock solenoid. The spring 56 prevents oscillation of the actuation member 40 and coil 35 is energized only when in park. Further, the compactness and simplicity of the parts contributes to the low cost of manufacture.

From the foregoing description, it may readily be observed by those skilled in the art that the present invention provides a novel lockout mechanism for an automatic shifter wherein the shifter is locked into park position unless the brake is applied. Those skilled in the art, of course, will appreciate the many advantages of the present invention over that shown in the prior art and will also recognize that many modifications can be made without departing from the concept and spirit of the invention.

The embodiments of the invention in which an exclusive property or privilege is claimed are defined as follows:

1. In a vehicle transmission shifter mechanism for a vehicle, said vehicle having a steering lock mechanism, an electrical key interlock module for controlling said steering lock mechanism and a brake, said vehicle transmission shifter mechanism having a brake/park/lock mechanism for preventing the shifting of said transmission shifter from park position to another gear position unless the brakes of the vehicle are applied;

a shifting lever movable from a park position to at least one other gear position;

an actuator for releasing said shifting lever for movement to said other gear position;

said brake/park/lock mechanism including an electrically operated control module having a pin movable between a locked position to an unlocked position, said control module being controlled by a driver applying the brakes of the vehicle in which said vehicle transmission shifter mechanism is mounted whereby when the brakes are not applied, said pin is urged to said locked position and when the brakes are applied, said pin is urged to a nearly unlocked position in which position actuation of said actuator can release said shifting lever for movement to said other gear position;

said control module including an electrical coil capable of being in an energized or de-energized state and an actuator member movable in response to energization of said coil;

said actuator member operatively connected to said pin;

a metal core proximate said electrical coil and said actuator member;

said actuator member having a magnetic force associated therewith so as to be attracted to said metal core when said coil is one of said energized or de-energized states to urge said pin to the locked position, and repelled by said metal core when said coil is in the other of said energized or de-energized states to urge said pin toward the nearly unlocked position;

an electrical switch for controlling the operation of said electrical key interlock module;

said actuator member being movable by said magnetic force toward said electrical switch to a first position nearly actuating said switch as said pin is urged toward the unlocked position to said nearly unlocked position wherein subsequently said actuator can move said pin to unlocked position for release by said actuator of said shifting lever for movement to said other gear position, whereby at said nearly unlocked position said actuator member is adapted to be moved to a second position by said actuator to actuate said switch and operate said key interlock module to unlock said steering lock mechanism.

2. The shifter mechanism of claim 1 in which a resilient restrainer element is provided in a position relative to said actuator member to exert a force on said actuator member opposite to said magnetic force exerted on said actuator member to prevent said magnetic force associated with said actuator member from actuating said actuator member to said second position; a force exerted on said pin by an operator of said shifting mechanism actuating said actuator being sufficient to move said pin permitting said actuator member to be moved to said second position at which said switch is actuated.

3. The shifter mechanism of claim 2 in which the resilient restrainer element is a spring.

4. The shifter mechanism of claim 3 in which the spring is a leaf spring located between said actuator member and switch.

5. The shifter mechanism of claim 1 in which said actuator member is operatively connected to said pin by a mechanical advantage means.

6. The shifter mechanism of claim 5 in which said mechanical advantage means is a toggle joint.

7. The shifter mechanism of claim 6 in which said toggle joint means includes a first link and a second link, one end of said first link being pivotally connected to one end of said second link providing a knee; the other end of said first link being pivoted about a fixed axis and the other end of said second link being pivotally connected about a movable axis to one end of said pin whereby the positions of said knee correspond to the locked and unlocked positions of said pin; and said actuator member being operatively connected to said first and second links at said knee.

8. The shifter mechanism of claim 7 in which said actuator member is a third link connected directly to said knee and containing a magnet being attracted to said core when the coil is in the de-energized state and repelled by said core when the coil is in the said energized state.

9. The shifter mechanism of claim 7 in which a resilient restrainer element is provided between the knee of said toggle joint and said switch whereby the force exerted on the bending action of said knee by the repelling magnetic force exerted by said metal core on said actuator member is insufficient to overcome the restraining force of said restrainer element; a subsequent force exerted on said pin by an operator of said shifting mechanism actuating said actuator being sufficient to overcome the restraining force of said restraining element and move said locking member to an unlocked position and said knee to said second position of actuating said switch.

10. The shifter mechanism of claim 9 in which said actuator member is a third link connected directly to said knee and containing a magnet being attracted to said core when the coil is in the de-energized state and repelled by said core when the coil is in the said energized state.

11. The shifter mechanism of claim 9 in which the resilient restrainer element is a spring.

12. The shifter mechanism of claim 11 in which the spring is a leaf spring located between said actuator member and switch.

13. The shifter mechanism of claim 1 in which the shifting lever is a tube having a pawl actuator slidably extending axially through at least a portion of the inner passageway of said tube; said pin in its locked position extending into said passageway into the path of the pawl actuator.

14. The shifter mechanism of claim 13 in which the control module including said toggle mechanism is located in a housing supported on said tube; said housing and said tube having aligned openings to accommodate the movement of said pin in and out of the path of said pawl actuator.

15. The shifter mechanism of claim 6 in which said actuator member extends substantially perpendicular to the axis of said pin; and each of said first and second links in the locked position of said pin extend at a slight angle away from said core and the axis of said pin and, in the unlocked position of said pin, extend at a greater angle away from said core and axis of said pin.

16. The shifter mechanism of claim 15 in which said pin extends and is movable substantially perpendicular to the axis of said tube.

17. The vehicle transmission shifter of claim 5 in which said pin is a locking member extending along a line, said mechanical advantage means includes an elongated mechanism in one position extending along said line said elongated mechanism pivotally mounted at one end on a fixed axis located on said line and secured to said locking member at its other end, said other end being movable with said locking member along said line, said elongated mechanism having an intermediate portion movable intermediate said ends toward a second position in a direction substantially orthogonal to said direction of said line and responsive to the movement of said locking member along said line and vice versa; said actuator member being operatively connected to said intermediate portion for restraining the movement of said locking member when said ends and intermediate portion are substantially aligned and said locking member is in locked position, and for moving said locking member when said intermediate portion is spaced from said line in a direction toward said actuator member and force is applied by said actuator member to said intermediate portion.

18. The vehicle shifter mechanism of claim 17 in which the mechanical advantage means is a toggle joint.

19. The shifter of claim 17 in which said toggle joint includes a first link and a second link, one of said first links being pivotally connected to one end of said second link providing a knee; the other end of said first link being pivoted about a fixed axis and the other end of said second link being pivotally connected about a movable axis to one end of said locking member whereby the positions of said knee correspond to the locked and unlocked positions of said locking member; and said actuator member being operatively connected to said first and second links at said knee.

20. The shifter of claim 19 in which said actuator member is a third link connected directly to said knee and said magnetic attracting and repelling force is created by a permanent magnet on said third link and an electrical coil and a metal core located proximate thereto, said coil being capable of being either energized or de-energized for repelling or attracting said magnet.

21. The shifter mechanism of claim 1 in which said electric switch is electrically connected in a first circuit to said coil and includes a lead for electrical connection to a second circuit to said electrical key interlock module whereby actuation of said switch opens the first circuit to said coil and closes the second circuit to said electrical key interlock module.

22. The shifter mechanism of claim 21 in which said actuator in said second position continues to actuate said switch while the shifting lever is in said other gear position.

23. A vehicle transmission shifter mechanism for a vehicle having a vehicle condition responsive means responsive to a first condition and a second condition of said vehicle, said vehicle transmission shifter having a locking member for preventing the shifting of said transmission shifter from park position to another gear position when the first condition of the vehicle exists, comprising:

said vehicle having a steering lock mechanism and an electrical key interlock module for controlling said steering lock mechanism;

a shifting lever movable from a park position to at least one other gear position;

a detent member associated with said shifting lever for releasably holding said lever in said park position;

an actuator for releasing said shifting lever for movement to said other gear position;

an electrically operated control module including said locking member movable between a locked position to an unlocked position, said control module being controlled by the first and second condition of the vehicle in which said vehicle transmission shifter is mounted whereby when the vehicle is in the first condition, said locking member is urged to said locked position and when the vehicle is in the second condition, said locking member is urged to a nearly unlocked position in which actuation of said actuator can release said shifting lever for movement to said other gear position;

said control module including an electrical coil capable of being in an energized or de-energized state and an actuator member movable in response to energization of said coil;

said actuator member operatively connected to said locking member;

a metal core proximate said electrical coil and said actuator member;

said actuator member having a magnetic force associated therewith so as to be attracted to said metal core when said coil is in one of said de-energized or energized state to urge said locked member to locked position and repelled when in the other of said de-energized or energized state to urge said locking member to the nearly unlocked position; and an electrical switch for controlling the operation of said electrical key interlock module;

said actuator member being movable by said magnetic force toward said electrical switch to a first position nearly actuating said switch as said pin is urged toward the unlocked position to said nearly unlocked position wherein subsequently said actuator can move said pin to unlocked position for release by said actuator of said shifting lever for movement to said other gear position, whereby at said nearly unlocked position said actuator member is moved to a second position by said actuator to actuate said switch to operate said key interlock module to unlock said steering lock mechanism.

24. The shifter mechanism of claim 23 in which a resilient restrainer element having a biasing force is provided in a position relative to said actuator member to exert a force on said actuator member opposite to said magnetic force exerted on said actuator member to prevent said magnetic force associated with said actuator member from actuating said actuator member to said second position; a force exerted on said locking member by an operator of said shifting mechanism actuating said actuator being sufficient to overcome said biasing force to move said locking member permitting said actuator member to be moved to said second position at which said switch is actuated.

25. The shifter mechanism of claim 24 in which the resilient restrainer element is a spring.

26. The shifter mechanism of claim 25 in which the spring is a leaf spring located between said actuator member and switch.

27. The shifter mechanism of claim 23 in which said mechanical advantage means includes a toggle which includes a first link and a second link, one of said first links being pivotally connected to one end of said second link providing a knee; the other end of said first link being pivoted about a fixed axis and the other end of said second link being pivotally connected about a movable axis to one end of said locking member whereby the positions of said knee correspond to the locked and unlocked positions of said locking member; and said actuator member being operatively connected to said first and second links at said knee.

28. The shifter of claim 23 in which the shifting lever is a tube having a pawl actuator slidably extending axially through at least a portion of the inner passageway of said tube; said locking member being elongated along an axis and in its locked position extending into said passageway into the path of the pawl actuator.

29. The shifter of claim 28 in which said mechanical advantage means includes a toggle mechanism and the control module including said toggle mechanism is located in a housing supported on said tube; said housing and said tube having aligned openings to accommodate the movement of said locking member in and out of the path and said pawl actuator.

30. The shifter of claim 23 in which said actuator member extends substantially perpendicular to the axis of said locking member; and each of said first and second links in the locked position of said locking member extend at a slight angle away from said core and the axis of said locking member and in the unlocked position of said locking member extend at a greater angle away from said core and axis of said locking member.

31. The shifter mechanism of claim 23 in which said electric switch is electrically connected in a first circuit to said coil and includes a lead for electrical connection to a second circuit to said electrical key interlock module whereby actuation of said switch opens the first circuit to said coil and closes the second circuit to said electrical key interlock module.

32. The shifter mechanism of claim 31 in which said actuator in said second position continues to actuate said switch while the shifting lever is in said other gear position.

33. A vehicle transmission shifter for a vehicle, said vehicle having a steering lock mechanism, an electrical key interlock for controlling said steering lock mechanism and a vehicle condition responsive means responsive to a first condition and a second condition of said vehicle, said vehicle transmission shifter having a locking member for preventing the shifting of said transmission shifter from park position to another gear position when the first condition of the vehicle exists, comprising:

a shifting lever movable from a park position to at least one other gear position;

a member associated with said shifting lever for releasably holding said lever in said park position;

an actuator means for releasing said shifting lever for movement to said other gear position;

an electrically operated control module including said locking member movable along a line between a locked position to an unlocked position, said control module being controlled by the first and second condition of the vehicle in which said vehicle transmission shifter is mounted whereby when the vehicle is in the first condition, said locking member is urged along said line in a first direction to said locked position and when the vehicle is in the second condition, said locking member is urged along said line in a second direction opposite to said one direction to the unlocked position; the improvement comprising:

said control module including a toggle joint for exerting forces on said locking member along said line in either of said first or second directions; and an actuator member operatively connected to said toggle joint for exerting a force on said toggle joint in a direction orthogonal to said first and second directions;

said toggle joint including a first link and a second link, one of said first links being pivotally connected to one end of said second link providing a knee; the other end of said first link being pivoted about a fixed axis and the other end of said second link being pivotally connected about a movable axis to one end of said locking member whereby the positions of said knee correspond to the locked and unlocked positions of said locking member; and said actuator member being operatively connected to said first and second links at said knee and having a magnetic force associated therewith;

an electrical switch for controlling the operation of said electrical key interlock module;

said actuator member being movable by said magnetic force toward said electrical switch to a first position nearly actuating said switch as said pin is urged toward the unlocked position to said nearly unlocked position wherein subsequently said actuator can move said pin to unlocked position for release by said actuator of said shifting lever for movement to said other gear position, whereby at said unlocked position said actuator member is moved to a second position by said actuator to actuate said switch to operate said key interlock module to unlock said steering lock mechanism.

34. The shifter mechanism of claim 33 in which a resilient restrainer element having a biasing force is provided in a position relative to said actuator member to exert a force on said actuator member opposite to said magnetic force exerted on said actuator member to prevent said magnetic force associated with said actuator member from actuating said actuator member to said second position; a subsequent force exerted on said locking member by an operator of said shifting mechanism actuating said actuator being sufficient to overcome said biasing force to move said locking member permitting said actuator member to be moved to said second position at which said switch is actuated.

35. The shifter mechanism of claim 33 in which said electric switch is electrically connected in a first circuit to said coil and includes a lead for electrical connection to a second circuit to said electrical key interlock module whereby actuation of said switch opens the first circuit to said coil and closes the second circuit to said electrical key interlock module.

36. The shifter mechanism of claim 35 in which said actuator in said second position continues to actuate said switch while the shifting lever is in said other gear position.

37. A locking mechanism which when actuated to locked position actuates a switch for controlling a second electrically operated device, said locking mechanism comprising an electrically operated control module having an elongated locking member movable longitudinally between a locked position to an unlocked position, said control module being controlled by applying electrical signals thereto whereby when electrical signals are not applied said locking member is urged to said locked position and when said signals are applied, said locking member is urged toward the unlocked position;

said control module including an electrical coil capable of being in an energized or de-energized state, and an actuator member movable in response to energization of said coil;

a toggle joint operatively connecting said actuator member to said locking member for providing a restraining force opposing the longitudinal movement of said locking member toward an unlocked position whereby said restraining force of said toggle decreases as said toggle joint moves said locking member toward unlocked position;

a metal core proximate said electrical coil and said actuator member; and said actuator member having a magnetic force associated therewith so as to be attracted to said metal core when said coil is in one of said energized or de-energized states for urging such pin to a locked position; said actuator member being repelled by said metal core when said coil is in the other of said energized or de-energized states to urge said pin to a nearly unlocked position;

an electrical switch for controlling the operation of said second electronically operated device;

said actuator member being movable by said magnetic force toward said electrical switch to a first position nearly actuating said switch as said locking member is urged toward the unlocked position to said nearly unlocked position; a restrainer operatively associated with said toggle joint for holding said actuator member at said first position until a subsequent force is exerted on said locking member in a longitudinal direction toward said unlocked position at which said unlocked position said switch is actuated.

38. The locking mechanism of claim 37 in which said locking member is a pin.

39. The locking mechanism of claim 37 in which said restrainer is a resilient restrainer element exerting a biasing force to prevent said magnetic force associated with said actuator member from actuating said actuator member past said first position; said restrainer element permitting a subsequent force exerted on said locking member to an unlocked position to overcome said biasing force to force said actuator member against the bias of said resilient restraining element to actuate said switch.

40. The locking mechanism of claim 39 in which the resilient restrainer element is a spring.

41. The locking mechanism of claim 40 in which the spring is a leaf spring located between said actuator member and switch.

42. The locking mechanism of claim 37 in which said toggle joint means includes a first link and a second link, one end of said first link being pivotally connected to one end of said second link providing a knee; the other end of said first link being pivoted about a fixed axis and the other end of said second link being pivotally connected about a movable axis to one end of said pin whereby the positions of said knee correspond to the locked and unlocked positions of said locking member; and said actuator member being operatively connected to said first and second links at said knee.

43. The locking mechanism of claim 42 in which said actuator member is a third link connected directly to said knee and containing a magnet being attracted to said core when the coil is in the de-energized state and repelled by said core when the coil is in the said energized state.

44. The shifter mechanism of claim 37 in which said electric switch is electrically connected in a first circuit to said coil and includes a lead for electrical connection to a second circuit to said electrically operated device whereby actuation of said switch opens the first circuit to said coil and closes the second circuit to said electrically operated device.

45. A locking mechanism which when actuated to locked position actuates a switch for controlling a second electrically operated device, said locking mechanism comprising an electrically operated control module including a locking member movable along a line between a locked position to an unlocked position, said control module being controlled by electrical signals whereby when said signals are applied said locking member is urged along said line in a first direction to said locked position and when said signals are not applied said locking member is urged along said line in a second direction opposite to said one direction to the unlocked position;

said control module including mechanical advantage means for exerting forces on said locking member along said line in either of said first or second direction; and an actuator member operatively connected to said mechanical advantage means for exerting a force on said mechanical advantage means in a direction orthogonal to said first and second directions;

a permanent magnetic force associated with said actuator member;

said permanent magnetic force adapted to exert on said actuator member a magnetic attracting and repelling force;

an electrical switch for controlling the operation of said second electrically operated device;

said actuator member being movably by said magnetic force toward said electrical switch to a first position nearly actuating said switch as said locking member is urged toward the unlocked position to said nearly unlocked position wherein subsequently application of a force to move said locking member to unlocked position moves said actuator member to a second position to actuate said switch.

46. The shifter mechanism of claim 45 in which said electric switch is electrically connected in a first circuit to said coil and includes a lead for electrical connection to a second circuit to said electrically operated device whereby actuation of said switch opens the first circuit to said coil and closes the second circuit to said electrically operated device.

47. A locking mechanism which when actuated to locked position actuates a switch for controlling a second electronically operated device, said locking mechanism comprising an electrically operated control module including a locking member movable along a line between a locked position to an unlocked position, said control module being controlled by electrical signals whereby when said signals are applied said locking member is urged along said line in a first direction to said locked position and when said signals are not applied said locking member is urged along said line in a second direction opposite to said one direction to the unlocked position;

said control module including mechanical advantage means for exerting forces on said locking member along said line in either of said first or second directions; and an actuator member operatively connected to said mechanical advantage means for exerting a force on said mechanical advantage means in a direction orthogonal to said first and second directions;

a magnetic force associated with said actuator member;

said magnetic force adapted to exert on said actuator member a magnetic force causing said locking member to be moved toward an unlocked position;

an electrical switch for controlling the operation of said second electronically operated device;

said actuator member being movable by said magnetic force toward said electrical switch to a first position nearly actuating said switch as said locking member is urged toward the unlocked position to said nearly unlocked position wherein subsequent application of a force to move said locking member to unlocked position moves said actuator member to a second position to actuate said switch.

48. The locking mechanism of claim 47 in which a resilient restrainer element is provided to exert a biasing force to prevent said magnetic force associated with said actuator member from actuating said actuator member past said first position; said restrainer element permitting a subsequent force exerted on said locking member to an unlocked position to overcome said biasing force to force said actuator member against the bias of said resilient restraining member to actuate said switch.

49. The locking mechanism of claim 48 in which the resilient restrainer element is a spring.

50. The locking mechanism of claim 49 in which the spring is a leaf spring located between said actuator member and switch.

51. The locking mechanism of claim 47 in which said mechanical advantage means includes an elongated mechanism pivotally mounted at one end on a fixed axis located on said line and secured to said locking member at its other end, said other end being movable with said locking member along said line, said elongated mechanism having an intermediate portion movable intermediate said ends in a direction substantially orthogonal to said direction of said line and responsive to the movement of said locking member along said line and vice versa; said actuator member being operatively connected to said intermediate portion for restraining the movement of said locking member when said ends and intermediate portion are substantially aligned and said locking member is in locked position, and for moving said locking member when said intermediate portion is spaced from said line in a direction toward said actuator member and force is applied by said actuator member to said intermediate portion.

52. The locking mechanism of claim 51 in which the mechanical advantage means is a toggle joint.

53. The locking mechanism of claim 52 in which said toggle joint includes a first link and a second link, one of said first links being pivotally connected to one end of said second link providing a knee; the other end of said first link being pivoted about a fixed axis and the other end of said second link being pivotally connected about a movable axis to one end of said locking member whereby the positions of said knee correspond to the locked and unlocked positions of said locking member; and said actuator member being operatively connected to said first and second links at said knee.

54. The shifter mechanism of claim 47 in which said electric switch is electrically connected in a first circuit to said coil and includes a lead for electrical connection to a second circuit to said electrically operated device whereby actuation of said switch opens the first circuit to said coil and closes the second circuit to said electrically operated device.

* * * * *